UNITED STATES PATENT OFFICE.

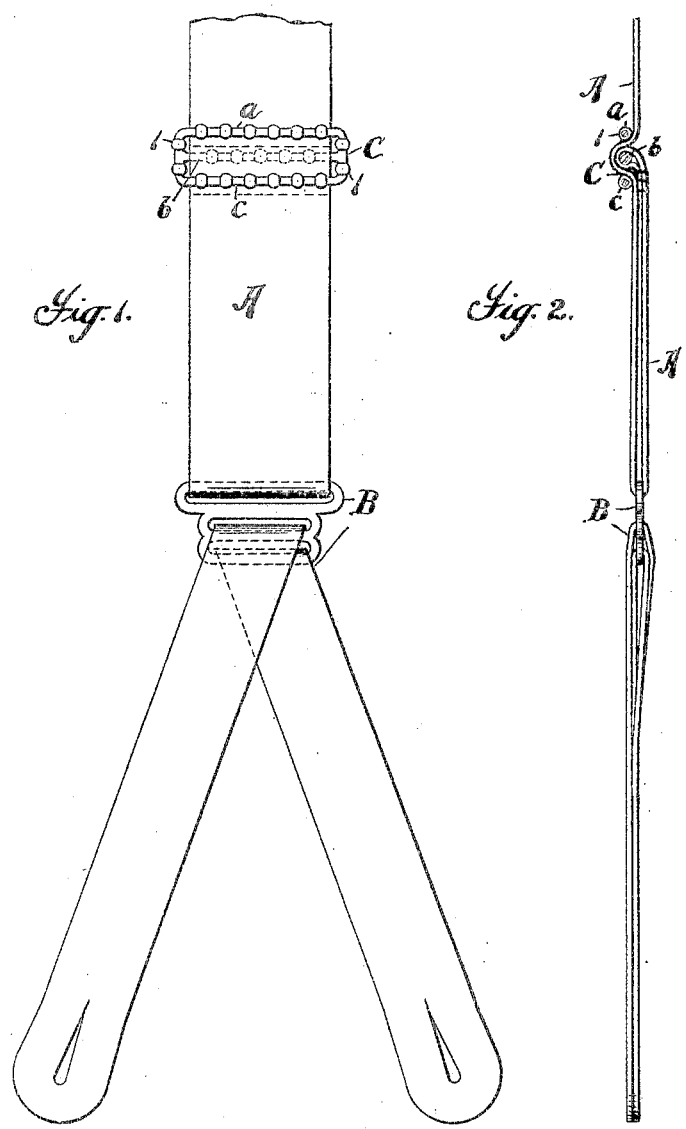

WILLIAM C. HOWARD, OF NEW YORK, N. Y.

SLIDE.

No. 797,118.　　　Specification of Letters Patent.　　　Patented Aug. 15, 1905.

Application filed May 8, 1905. Serial No. 259,331.

*To all whom it may concern:*

Be it known that I, WILLIAM C. HOWARD, a citizen of the United States, residing at New York city, county of Kings, and State of New York, have invented certain new and useful Improvements in Slides, fully described and represented in the following specification and the accompanying drawings, forming a part of the same.

This invention relates to a novel slide of that class used for adjustably holding webbing—as, for instance, in suspenders, stocking-supporters, and the like.

The especial object of the invention is to secure a strong hold of the webbing by rounded surfaces, thus avoiding the cutting or tearing of the material, and to secure the adjustment and firm holding of the webbing without the usual hinged clasp. I secure these results and at the same time provide a slide of improved appearance by the use of beaded surfaces, between which the webbing is held.

In the accompanying drawings, forming a part of this specification, the invention is shown as applied in its preferred form to a suspender-slide, and this construction will now be described in detail and the features forming the invention particularly pointed out in the claims.

In the drawings, Figure 1 is a front view of a suspender-end provided with my slide. Fig. 2 is an edge view of the same, showing the slide in section. Fig. 3 is a detail view of the slide.

Referring to said drawings, A is the usual webbing suspender-end carrying the button-piece B, shown as hung in a loop in the webbing A.

The slide C is formed of three bars $a$ $b$ $c$, each of which is provided with the beads 1. This slide is preferably formed of beaded wire, as shown, and may conveniently be made of a single piece. As shown, the end of the loop of the webbing A, in which the button-piece B is suspended, is secured about the middle bar $b$ of the slide C, and the webbing passes between the middle bar $b$ and the two side bars $a$ $c$, so as to be held by the beaded surfaces under the pressure produced by the pull on the webbing. When it is desired to adjust the slide on the webbing, it is necessary only to bring the webbing on opposite sides of the slide into a position approaching right angles to the slide, and the webbing may then be moved readily through the slide and adjusted as desired.

It will be understood that the invention is not limited to the specific form of slide shown, but that this may be varied while retaining the invention as defined by the claims.

What I claim is—

1. A slide for holding webbing and the like having the three beaded bars $a$, $b$, $c$ spaced apart for the passage of the webbing.

2. The slide C formed of beaded wire and having the three holding-bars $a$, $b$, $c$.

In testimony whereof I have hereunto set my hand in the presence of two subscribing witnesses.

WILLIAM C. HOWARD.

Witnesses:
J. A. GRAVES,
G. M. BORST.